US012691971B2

(12) United States Patent
Kluge et al.

(10) Patent No.: US 12,691,971 B2
(45) Date of Patent: Jul. 28, 2026

(54) COMPACT BICYCLE DRIVE FOR AN ELECTRICALLY DRIVABLE BICYCLE

(71) Applicant: Porsche eBike Performance GmbH, Ottobrunn (DE)

(72) Inventors: Marc Kluge, Besigheim (DE); Jörg Aniol, Leonberg (DE)

(73) Assignee: Porsche eBike Performance GmbH, Ottobrunn (DE)

( * ) Notice: Subject to any disclaimer, the term of this patent is extended or adjusted under 35 U.S.C. 154(b) by 418 days.

(21) Appl. No.: 18/327,726

(22) Filed: Jun. 1, 2023

(65) Prior Publication Data

US 2023/0415848 A1 Dec. 28, 2023

(30) Foreign Application Priority Data

Jun. 27, 2022 (DE) ......................... 102022115945.0

(51) Int. Cl.
B62M 6/55 (2010.01)
B62M 11/14 (2006.01)

(52) U.S. Cl.
CPC .............. B62M 6/55 (2013.01); B62M 11/14 (2013.01)

(58) Field of Classification Search
CPC ...... B62M 6/55; B62M 11/14; B62M 11/145; B62M 6/75; B62M 7/00; F16H 2001/2881
See application file for complete search history.

(56) References Cited

U.S. PATENT DOCUMENTS

| | | | |
|---|---|---|---|
| 5,910,066 A | 6/1999 | Schulz et al. | |
| 9,873,480 B2 | 1/2018 | Yamamoto | |
| 2017/0137085 A1* | 5/2017 | Yamamoto | .............. F16H 3/666 |

FOREIGN PATENT DOCUMENTS

| | | | | |
|---|---|---|---|---|
| CN | 107054544 A | | 8/2017 | |
| CN | 116670022 A | * | 8/2023 | .............. B62M 6/55 |
| DE | 10110644 A1 | * | 9/2002 | .............. F16H 13/06 |
| DE | 102012004995 A1 | * | 9/2013 | .............. F16H 1/28 |
| DE | 102016223363 A1 | | 5/2018 | |
| DE | 102018003767 A1 | * | 11/2019 | .......... F16H 35/008 |
| DE | 102018004061 A1 | * | 11/2019 | .............. F01L 1/352 |
| DE | 102020102986 A1 | | 8/2021 | |
| DE | 102020128385 A1 | | 4/2022 | |
| DE | 102020128826 A1 | * | 5/2022 | .............. B62M 6/55 |
| DE | 102021100607 A1 | | 7/2022 | |
| DE | 102023200342 B3 | * | 6/2024 | .............. B60K 1/02 |
| EP | 1715143 A2 | * | 10/2006 | .............. F01L 1/352 |
| EP | 4494992 A1 | * | 1/2025 | ............ B62M 11/14 |
| EP | 4463361 B1 | * | 10/2025 | ............ B62M 11/18 |
| WO | WO-2012163382 A1 | * | 12/2012 | .............. F16H 1/28 |

OTHER PUBLICATIONS

Looman, J., "Gear transmission," Basics, constructions, applications in vehicles, Springer, Jan. 1, 2009, 44 pages.

* cited by examiner

*Primary Examiner* — Drew J Brown
(74) *Attorney, Agent, or Firm* — Slater Matsil, LLP

(57) ABSTRACT
In an embodiment a bicycle drive includes a pedal crankshaft configured to input mechanical drive power, an electric machine coupleable to the pedal crankshaft configured to input electric drive power and/or output generator power and a Wolfrom transmission interposed in a torque flow between the electric machine and the pedal crankshaft.

20 Claims, 1 Drawing Sheet

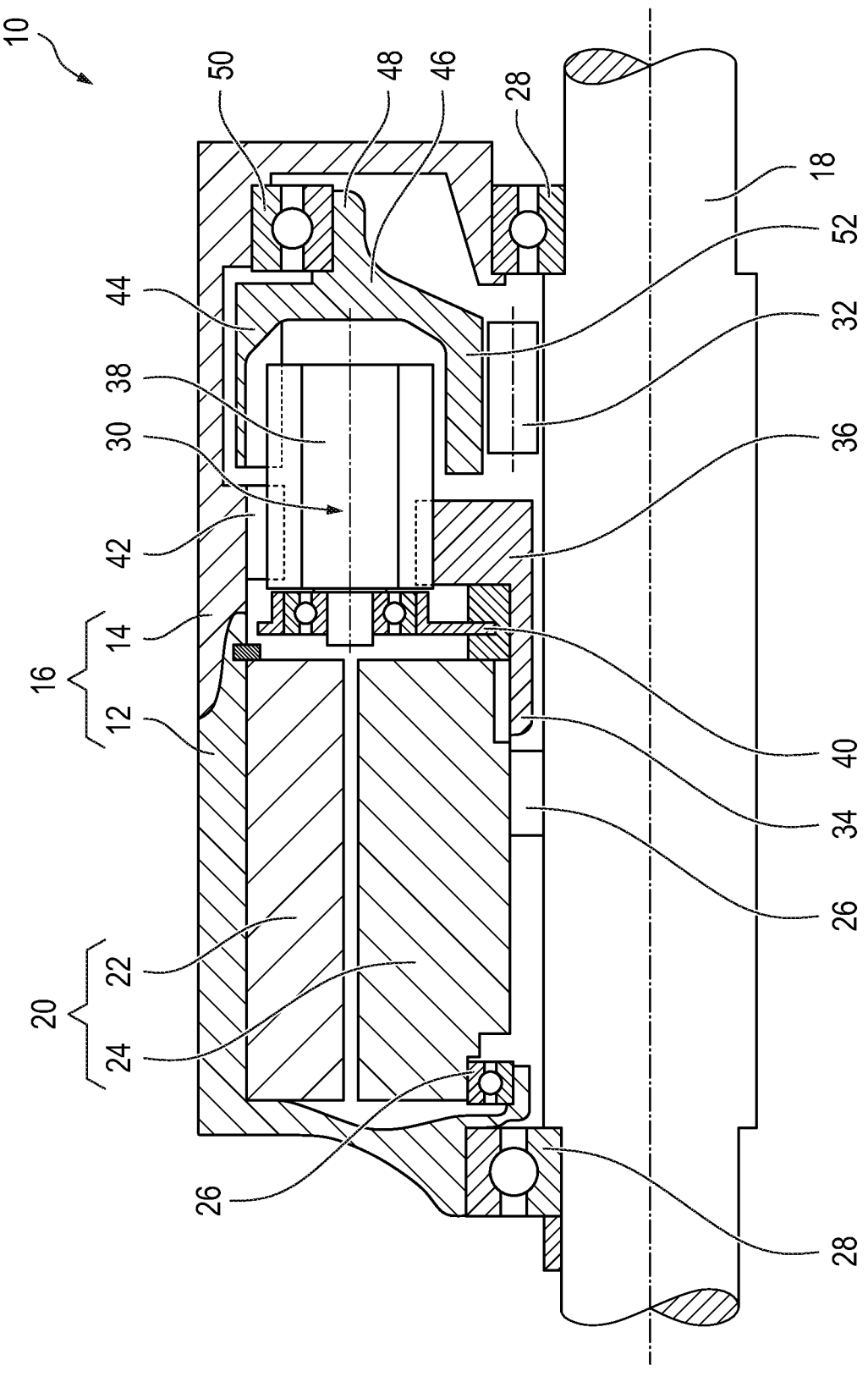

COMPACT BICYCLE DRIVE FOR AN ELECTRICALLY DRIVABLE BICYCLE

CROSS-REFERENCE TO RELATED APPLICATIONS

This application claims priority to German Application No. 102022115945.0, filed on Jun. 27, 2022, which application is hereby incorporated herein by reference.

TECHNICAL FIELD

The invention relates to a bicycle drive by means of which an electrically drivable bicycle can be driven mechanically and/or electrically.

BACKGROUND

From patent application DE 10 2016 223 363 A1, a bicycle drive for an electrically drivable bicycle is known, in which a rotor of an electric machine is connected to a ring gear of a planetary gear, the ring gear meshing with a planetary gear that simultaneously meshes with a fixed first sun gear and a rotatable second sun gear connected to a pedal crankshaft.

Patent Application DE 10 2020 102 986 A1 discloses a bicycle drive for an electrically drivable bicycle, in which a rotor of an electric machine is connected to a sun gear of a planetary gear, which meshes via a stepped planetary gear having a first number of teeth with a stationary first ring gear and having a second number of teeth different from the first number of teeth with a rotatable second ring gear connected to a pedal crankshaft.

SUMMARY

Embodiments provide use of an available installation space for a bicycle drive and the reduction of the installation space requirement.

Embodiments provide a compact bicycle drive for an electrically drivable bicycle.

One embodiment relates to a bicycle drive for an electrically drivable bicycle, comprising a pedal crankshaft for inputting a mechanical drive power, an electric machine coupleable to the pedal crankshaft for inputting an electric drive power and/or outputting a generator power, and a Wolfrom transmission interposed in the torque flow between the electric machine and the pedal crankshaft.

In the Wolfrom transmission, in contrast to a classic planetary transmission, a planet gear does not mesh with a single ring gear, but with two ring gears provided axially next to each other. Compared to the classic planetary transmission, the otherwise single ring gear can be divided into two annular halves and/or the planet gear is extended in the axial direction. Due to the two ring gears meshing with the at least one planetary gear, it is possible to keep the one ring gear fixed in motion so that the transmission ratio can be maximized. With the help of the other ring gear, a torque flow can be realized in a radially outer area without the need for a further planet carrier or a further sun gear. As a result, installation space can be kept free in a radially inner area, which makes it possible to arrange further components of the bicycle drive in a particularly compact manner, in particular to insert them axially into the Wolfrom transmission and to achieve radial nesting that saves installation space.

This makes use of the knowledge that the pedal crankshaft should be provided centrally in the bicycle drive and the other components, i.e. the electric machine and the Wolfrom transmission, should be provided in a radially outer ring space relative to the pedal crankshaft. This can be implemented particularly well and in a space-saving manner thanks to the radially inner installation space saved by the Wolfrom transmission. In addition, the knowledge is exploited that the radial extent of the installation space requirement of the bicycle drive is essentially determined by the electric machine formed annularly around the pedal crankshaft, so that this radial extent can be well exploited for the ring gears of the Wolfrom transmission in order to reduce or keep low the installation space requirement of the bicycle drive in the axial direction by providing free installation space in a radially inner ring region radially outside the pedal crankshaft. As a result, the electrified bicycle drive can be easily provided between the pedals of the pedal crankshaft in an area of a bicycle frame where a bottom bracket of the pedal crankshaft would be provided in a conventional non-electrified bicycle. Compared with the conventional bicycle, it is possible to achieve electrification of the bicycle with the aid of the compactly designed bicycle drive by a moderate increase in the radial installation space in the region of the conventional bottom bracket, without having to significantly increase the axial installation space requirement for this purpose. The radially inner installation space created with the help of the Wolfrom transmission enables a compact bicycle drive for an electrically drivable bicycle with a high transmission ratio.

The drivable bicycle may be, in particular, an E-bike, pedelec, tricycle, rickshaw, or other means of transportation capable of transmitting mechanical power introduced by a user via the pedal crankshaft to at least one drive wheel for propulsion.

The electric machine, which is preferably designed as an internal rotor, can have a stator comprising electromagnets and a rotor comprising permanent magnets cooperating with the stator. The electric machine, in particular the stator, is in particular coupled to a rechargeable battery in which electric energy can be stored. The battery may be arranged as a whole or in part, for example together with the electric machine and/or together with the Wolfrom transmission in a common housing. However, it is also possible for the battery as a whole or in part to be arranged at a distance from the bicycle drive. In a motor mode, the electric machine can generate electric power supplied by the battery, which can be supplied to the pedal crankshaft via the Wolfrom transmission, for example to assist or replace mechanical propulsion. In a generator mode, the electric machine can branch off all or part of a mechanical power applied to the pedal crankshaft via the Wolfrom transmission and generate electric power that can be stored in the battery. The mechanical power of the pedal crankshaft may be introduced via the at least one drive wheel, for example during a downhill ride, and/or may be applied by the user of the bicycle.

In the torque flow from the electric machine to the pedal crankshaft, the Wolfrom transmission effects in particular a conversion of the rotational speed into a slower one, i.e. a reduction, so that the torque input into the Wolfrom transmission by the electric machine during motor operation can be increased when it is input into the pedal crankshaft. Power introduced from the electric machine via a sun gear or a planet carrier can be output converted to a lower speed and higher torque by the rotatable ring gear of the Wolfrom transmission.

The pedal crankshaft may have cranks provided with foot pedals or hand grips at its axial ends, so that a user of the bicycle can easily input mechanical power into the pedal crankshaft. For example, a transmission element, in particular a drive gear, may be non-rotatably connected to the pedal crankshaft and may be capable of rotating the at least one drive wheel, for example, via a traction means, in particular a drive chain, for example via a pinion non-rotatably connected to a drive gear shaft of the drive wheel, in order to generate the propulsion of the bicycle.

In particular, the electric machine and the Wolfrom transmission are arranged coaxially with the pedal crankshaft next to each other in the axial direction. The radial installation space requirement is thus kept low. The pedal crankshaft can run radially inwards, in particular centrally, to both the electric machine and the Wolfrom transmission. An axis of rotation of the rotor of the electric machine and a main axis of rotation of the Wolfrom transmission can coincide with the axis of rotation of the pedal crankshaft.

Preferably, the electric machine and the Wolfrom transmission are arranged within a housing, with the pedal crankshaft protruding from the housing on both axial sides of the housing. The housing can protect the rotatable components of the bicycle drive from environmental influences. Here, it is particularly possible to provide a lubricant, for example grease or lubricating oil, within the housing, for example to lubricate bearings and/or the Wolfrom transmission. The housing can prevent contamination of the lubricant.

Particularly preferably, the pedal crankshaft is mounted on the housing, in particular on the axial walls of the housing, via bearings, preferably roller bearings. In addition or alternatively, the pedal crankshaft can be sealed off from the housing, for example by means of a radial shaft seal. The pedal crankshaft together with the housing can form a bottom bracket, whereby the housing can be large enough to also accommodate the electric machine and the Wolfrom transmission. The seal can prevent a lubricant provided within the housing from leaking or becoming contaminated.

In particular, the electric machine has a rotor mounted on the housing and/or on the pedal crankshaft. The electric machine can be designed as an internal rotor, so that a rotor shaft of the rotor designed as a hollow shaft can be mounted and/or supported on the pedal crankshaft via a sliding bearing in an installation space saving manner, whereby this sliding bearing can be designed in particular as a radial sliding bearing. The bearing of the rotor on the housing can be designed in particular as a rolling bearing, which can preferably support the rotor radially and axially. Particularly preferably, the rotor is supported in both axial directions via the bearing on the housing and thus positioned in a defined manner in the axial direction.

Preferably, the housing has a first housing half predominantly enclosing the electric machine and a second housing half predominantly enclosing the Wolfrom transmission. The first housing half and the second housing half can be pressed against each other in the axial direction. Preferably, a part of one housing half can be inserted into a part of the other housing half, in particular via a seal provided therebetween in the axial direction and/or radial direction. Particularly preferably, the pedal crankshaft can be mounted on the housing via two bearings, wherein the bearings can each be positioned in an axially defined manner between a shaft shoulder of the pedal crankshaft and a securing element, for example a circlip. As a result, during assembly of the bearings, when the respective bearing is pressed against the shaft shoulder, the housing half axially abutting against the respective bearing can simultaneously be pressed against the respective other housing half. This simplifies assembly of the bicycle drive.

Particularly preferably, the Wolfrom transmission has a sun gear coupled to a rotor of the electric machine, a planet gear meshing with the sun gear, a fixed first ring gear meshing with the planet gear, and a second ring gear meshing with the planet gear and coupleable to the pedal crankshaft. In particular, the fixed first ring gear is provided on an axial portion of the planet gear facing toward the electric machine, while the rotatable second ring gear is provided on an axial portion of the planet gear facing away from the electric machine. This enables the Wolfrom transmission to achieve maximum rotational speed reduction and maximum torque transmission in the torque flow from the electric machine to the pedal crankshaft. This enables particularly powerful propulsion of the bicycle with the aid of the electric machine.

In particular, the sun gear has an axially projecting hub, wherein the hub is rotationally fixedly connected to a/the rotor of the electric machine, in particular via a plug-in toothing. The hub can simultaneously provide an axial offset of the sun gear toothing meshing with the at least one planetary gear with respect to the electric machine as well as a rotationally fixed coupling of the sun gear with the rotor of the electric machine. The sun gear may be plugged on the pedal crankshaft together with the hub, whereby tilting of the sun gear from a radial plane perpendicular to the axis of rotation of the pedal crankshaft may be avoided or at least minimized.

Preferably, the sun gear, in particular the hub of the sun gear, is mounted on the pedal crankshaft, in particular via a sliding bearing, so as to be relatively rotatable. Tilting of the sun gear from a radial plane perpendicular to the axis of rotation of the pedal crankshaft is thus avoided or at least minimized without having to increase the radial installation space requirement.

Particularly preferably, the planet gear in mesh with the first ring gear and with the second ring gear has a constant diameter and a constant number of teeth. The planetary gear can have a constant cross-section apart from draft angles at the axial ends and/or any helical teeth provided in the axial direction. A stepped course of the planet gear, which would turn the planet gear into a stepped planet gear, is avoided. Since this avoids a partial area of the planetary gear with a smaller diameter set back in a step-like manner relative to the rest of the planetary gear, the installation space available in the radial direction at the radially outer edge can be utilized particularly well for forming the ring gears of the Wolfrom transmission. It is not necessary to provide ring gears with different nominal diameters by means of a complex and cost-intensive modification of the Wolfrom transmission due to replacement of the planetary gear with a stepped planetary gear. Instead, an essentially cylindrical installation space can be compactly utilized and installation space can be created in the radially inner area radially outside the pedal crankshaft, which favors a more compact design of the bicycle drive with a small axial extension.

In particular, the first ring gear and the second ring gear have the same inner diameter, with the first ring gear and the second ring gear having the same or a different number of teeth. Preferably, the first ring gear and the second ring gear are identical in design, whereby manufacturing costs can be kept low. However, it may be provided that the first ring gear and the second ring gear differ somewhat in their number of teeth and their modulus, for example in order to be able to adjust the transmission ratio of the Wolfrom transmission appropriately or to change it subsequently by replacing the second ring gear.

Preferably, the second ring gear has a disc projecting radially inwards, wherein the disc can be coupled to the pedal crankshaft, in particular via a freewheel. Via the disc, the torque flow from the radially outer inner toothing of the second ring gear can be directed to the radially inner pedal crankshaft. In particular, the disc can have a cranked course in the radial direction so that it can run past the internals provided on both axial sides.

Particularly preferably, the disc has a disc hub that surrounds the planetary gear radially inwardly. The disc hub can provide sufficient axial extension to provide a torque-transmitting coupling with the pedal crankshaft. This makes it easier to provide a freewheel between the disk hub of the second ring gear and the pedal crankshaft, which can be designed to be robust and stable enough for the torque to be transmitted.

In particular, the second ring gear has a radially inwardly offset and axially projecting bearing collar for fitting a ring gear bearing provided radially outside the bearing collar for mounting the second ring gear on a/the housing. The bearing collar enables a good support of the rotatable second ring gear, the support in particular preventing or at least reducing tilting of the second ring gear from a radial plane perpendicular to the axis of rotation of the pedal crankshaft. For this purpose, the support can be provided radially on the outside of the bearing collar, so that the bearing has a large diameter compared to a bearing provided radially on the inside of the bearing collar. In particular, the bearing may have an outer diameter corresponding to the outer diameter of the second ring gear. The space available at the radially outer edge can thus be well utilized and radially inner space can be kept free for other components.

Preferably, the planet gear is held on a planet carrier so as to be relatively rotatable, wherein in particular the planet carrier is mounted on the sun gear, in particular a hub of the sun gear, so as to be relatively rotatable. In particular, the planet carrier can be radially supported on a radially outer circumferential surface of a hub of the sun gear. In addition, the axial relative position of the planet carrier between the sun gear and the electric machine can be predefined. The planet carrier can cover the electric machine on the axial side facing the Wolfrom transmission and can protect an air gap between the rotor and the stator of the electric machine.

BRIEF DESCRIPTION OF THE DRAWINGS

In the following, the invention is exemplarily explained with reference to the accompanying drawing by using a preferred embodiment, wherein the features shown below may each individually or in combination constitute embodiments of the invention.

The FIGURE is a schematic sectional view of a bicycle drive.

DETAILED DESCRIPTION OF ILLUSTRATIVE EMBODIMENTS

The bicycle drive 10 shown in the FIGURE essentially only with its upper half can be provided, in particular, for an electrically drivable bicycle designed as an e-bike instead of in the area of an otherwise provided bottom bracket of a conventional bicycle. The bicycle drive 10 has a cylindrical housing 16 composed of a first housing half 12 and a second housing half 14, which is penetrated centrally by a pedal crankshaft 18. The first housing half 12 houses an electric machine 20 configured as an internal rotor, which includes a stator 22 connected to the first housing half 12 and a rotor 24 cooperating with the stator 22. The rotor 24 is mounted and supported on the pedal crankshaft 18 via a sliding bearing 26 and on the first housing half 12 via a rotor bearing 28 configured as a roller bearing. The pedal crankshaft 18 is mounted and supported on one axial side of the housing 16 on the first housing half 12 and on the other axial side of the housing 16 on the second housing half 14 via shaft bearings 28 configured as roller bearings. If necessary, the pedal crankshaft 18 can be sealed with respect to the housing 16, for example via radial shaft seals.

The electric machine 20 can be coupled to the pedal crankshaft 18 via a Wolfrom transmission 30 and a freewheel 32 in order to electrically drive the bicycle in a motor mode and/or to generate electric power in a generator mode. For this purpose, the rotor 24 of the electric machine 20 is coupled to an axially projecting hub 34 of a sun gear 36 of the Wolfrom transmission 30 in a rotationally fixed manner, for example, via a plug-in toothing. The sun gear 36 meshes with at least one planetary gear 38, which is rotatably supported on a planet carrier 40 about a secondary axis of rotation. The planet carrier 40 may be mounted and supported radially on the hub 34 of the sun gear 36, and may be mounted and/or supported in a defined position axially between the remainder of the sun gear 36 and the rotor 24, for example via a axial/radial sliding bearing combination. A first ring gear 42 is provided in a common axial region with sun gear teeth of the sun gear 36 meshing with the planet gear 38, which first ring gear 42 meshes with the planet gear 38 and is connected to the immovable housing 16, in particular to the second housing half 14, in a manner fixed against movement. The planetary gear 38 is axially extended with a constant diameter and a constant number of teeth over the axial extent of the first ring gear 42 and the sun gear teeth of the sun gear 36, so that a second ring gear 44 in the axial direction adjacent to the first ring gear 42, can mesh with the planetary gear 38, said second ring gear 44 is rotatable relative to the housing 16.

The second ring gear 44 has a disc 46 which extends axially next to the planet gear 38 in a radially inward direction and may be cranked. On the axial side pointing away from the planet gear 38, a bearing collar 48 projects from the disk 46, on the radially outwardly pointing lateral surface of which a ring gear bearing 50, in particular in the form of a roller bearing, is fitted. Via the ring gear bearing 50, the second ring gear 44 is mounted on the housing 16, in particular on the second housing half 14, and is supported in the radial direction and/or axial direction. Radially inward of the planet gear 38, a disc hub 52 projects from the disc 46 and faces the rotor 24. The axial extent of the disc hub 52 into a common axial region with the planetary gear 38 is thereby large enough that coupling with the pedal crankshaft 18 can occur via the freewheel 32, which is of corresponding length in the axial direction. The freewheel 32 can thereby be partially inserted axially into an annular installation space between the pedal crankshaft 18 and the planetary gear 38 and arranged in a nested manner in the radial direction, resulting in a compact structure for the bicycle drive 10 which saves installation space in the axial direction.

What is claimed is:
1. A bicycle drive comprising:
a pedal crankshaft configured to input mechanical drive power;

an electric machine coupleable to the pedal crankshaft and configured to provide drive power and/or generator power; and a Wolfrom transmission interposed between the electric machine and the pedal crankshaft, wherein the Wolfrom transmission comprises a sun gear coupled to a rotor of the electric machine, a planet gear meshing with the sun gear, a fixed first ring gear meshing with the planet gear, and a second ring gear meshing with the planet gear and coupleable to the pedal crankshaft, wherein the planet gear is relatively rotatably held on a planet carrier, and wherein the planet carrier is relatively rotatably mounted on the sun gear.

2. The bicycle drive of claim 1, wherein the electric machine and the Wolfrom transmission are arranged coaxially with respect to the pedal crankshaft side by side in an axial direction.

3. The bicycle drive of claim 1, wherein the electric machine and the Wolfrom transmission are disposed within a housing, wherein the pedal crankshaft protrudes from the housing on both axial sides of the housing, and wherein the electric machine comprises the rotor supported on the housing.

4. The bicycle drive of claim 1, wherein the electric machine and the Wolfrom transmission are disposed within a housing, wherein the pedal crankshaft protrudes from the housing on both axial sides of the housing, and wherein the electric machine comprises the rotor supported on the pedal crankshaft.

5. The bicycle drive of claim 1, wherein the electric machine and the Wolfrom transmission are disposed within a housing, wherein the pedal crankshaft protrudes from the housing on both axial sides of the housing, and wherein the electric machine comprises the rotor supported on the housing and on the pedal crankshaft.

6. The bicycle drive of claim 1, wherein the sun gear has an axially projecting hub, and wherein the hub is connected in a rotationally fixed manner.

7. The bicycle drive of claim 1, wherein the planet gear meshing with the first ring gear and with the second ring gear has a constant diameter and a constant number of teeth.

8. The bicycle drive of claim 1, wherein the second ring gear has a radially inwardly projecting disc, and wherein the disc is coupleable to the pedal crankshaft.

9. The bicycle drive of claim 8, wherein the disc includes a disc hub radially inwardly surrounding a planet gear.

10. The bicycle drive of claim 1, wherein the second ring gear has a radially inwardly projecting disc, and wherein the disc is coupleable to the pedal crankshaft via a freewheel.

11. The bicycle drive of claim 1, wherein the second ring gear includes a radially inwardly offset and axially projecting bearing collar for fitting a ring gear bearing provided radially outwardly of the bearing collar for supporting the second ring gear on a housing.

12. The bicycle drive of claim 1, wherein the planet carrier is relatively rotatably mounted on a hub of the sun gear.

13. A bicycle drive comprising:

a pedal crankshaft configured to input mechanical drive power;

an electric machine coupleable to the pedal crankshaft and configured to provide drive power and/or generator power; and a Wolfrom transmission interposed between the electric machine and the pedal crankshaft, wherein the Wolfrom transmission comprises a sun gear coupled to a rotor of the electric machine, a planet gear meshing with the sun gear, a fixed first ring gear meshing with the planet gear, and a second ring gear meshing with the planet gear and coupleable to the pedal crankshaft, wherein the sun gear has an axially projecting hub, and wherein the hub is connected in a rotationally fixed manner, via a plug-in toothing, to the rotor of the electric machine.

14. The bicycle drive of claim 13, wherein the electric machine and the Wolfrom transmission are disposed within a housing, wherein the pedal crankshaft protrudes from the housing on both axial sides of the housing, and wherein the electric machine comprises the rotor supported on the housing and on the pedal crankshaft.

15. The bicycle drive of claim 13, wherein the planet gear meshing with the first ring gear and with the second ring gear has a constant diameter and a constant number of teeth.

16. The bicycle drive of claim 13, wherein the second ring gear has a radially inwardly projecting disc, and wherein the disc is coupleable to the pedal crankshaft.

17. The bicycle drive of claim 16, wherein the disc includes a disc hub radially inwardly surrounding a planet gear.

18. The bicycle drive of claim 13, wherein the second ring gear has a radially inwardly projecting disc, and wherein the disc is coupleable to the pedal crankshaft via a freewheel.

19. The bicycle drive of claim 13, wherein the second ring gear includes a radially inwardly offset and axially projecting bearing collar for fitting a ring gear bearing provided radially outwardly of the bearing collar for supporting the second ring gear on a housing.

20. The bicycle drive of claim 13, wherein the planet gear is relatively rotatably held on a planet carrier, and wherein the planet carrier is relatively rotatably mounted on the hub.

* * * * *